(12) United States Patent
Vorderbruggen et al.

(10) Patent No.: US 9,328,590 B2
(45) Date of Patent: May 3, 2016

(54) WELL TREATMENT OPERATIONS USING A TREATMENT AGENT COATED WITH ALTERNATING LAYERS OF POLYIONIC MATERIAL

(75) Inventors: Mark Alan Vorderbruggen, Spring, TX (US); Hong Sun, Houston, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 566 days.

(21) Appl. No.: 13/283,405

(22) Filed: Oct. 27, 2011

(65) Prior Publication Data
US 2013/0105154 A1 May 2, 2013

(51) Int. Cl.
*E21B 43/04* (2006.01)
*C09K 8/80* (2006.01)
*E21B 43/267* (2006.01)

(52) U.S. Cl.
CPC .................. *E21B 43/04* (2013.01); *C09K 8/805* (2013.01); *E21B 43/267* (2013.01)

(58) Field of Classification Search
CPC ............ C09K 3/00; C09K 3/30; C09K 5/045; C09K 8/36; C09K 8/52; C09K 8/62; C09K 8/68; C09K 8/80; C09K 21/08; C09K 2205/10; C09K 2205/24; C09K 2205/32; C09K 2208/30; C09K 5/00; C09K 8/18; E21B 43/12; E21B 47/00; E21B 47/06; E21B 34/08; E21B 43/16; E21B 43/24; E21B 43/26; E21B 43/267; E21B 44/00; E21B 10/02; E21B 10/55; E21B 17/00; E21B 2033/005; E21B 21/00; E21B 23/01
See application file for complete search history.

(56) References Cited

U.S. PATENT DOCUMENTS

| | | | |
|---|---|---|---|
| 3,682,249 A | 8/1972 | Fischer et al. | |
| 6,309,431 B1 | 10/2001 | Becker et al. | |
| 6,364,018 B1 | 4/2002 | Brannon et al. | |
| 6,896,926 B2 | 5/2005 | Qiu et al. | |
| 7,032,664 B2 | 4/2006 | Lord et al. | |
| 7,115,546 B2 | 10/2006 | Qu et al. | |
| 7,144,844 B2 | 12/2006 | Qu et al. | |
| 7,493,955 B2 | 2/2009 | Gupta et al. | |
| 7,507,469 B2 | 3/2009 | Mao et al. | |
| 7,931,089 B2 | 4/2011 | Miller et al. | |
| 2004/0110877 A1 | 6/2004 | Becker | |
| 2007/0114030 A1* | 5/2007 | Todd | C09C 3/12 166/280.2 |
| 2008/0011477 A1* | 1/2008 | Rediger | C09K 8/64 166/280.2 |
| 2010/0019456 A1* | 1/2010 | Gerrard | E21B 33/10 277/336 |
| 2011/0077176 A1 | 3/2011 | Smith et al. | |
| 2011/0105367 A1 | 5/2011 | Bicerano et al. | |
| 2011/0118155 A1* | 5/2011 | Pisklak | C04B 20/1074 507/274 |

OTHER PUBLICATIONS

N. Pargaonkar, Y. M. Lvov, N. Li, J. H. Steenekamp, and M. M. de Villiers, Controlled release of dexamethasone from microcapsules produced by polyelectrolyte Layer-by-Layer nanoassembly, Pharmaceutical Research, 2005, 22, 826-835.*

Lu et al., "Magnetic Switch of Permeability for Polyelectrolyte Microcapsules Embedded with Co@Au Nanoparticles", American Chemical Society, Langmuir 2005, 21, 2042-2050.

* cited by examiner

*Primary Examiner* — Susannah Chung
*Assistant Examiner* — Kumar R Bhushan
(74) *Attorney, Agent, or Firm* — John Wilson Jones; Jones & Smith, LLP

(57) ABSTRACT

Well treatment agents containing a particulate substrate are coated with a polyelectrolyte bilayer to provide a well treatment composite for use in well treatment operations. Each layer of the polyelectrolyte bilayer is composed of oppositely charged polyionic material. The well treatment composite may further contain a succession of polyelectrolyte bilayers, each polyelectrolyte bilayer containing layers of oppositely charged polyionic materials.

28 Claims, 1 Drawing Sheet

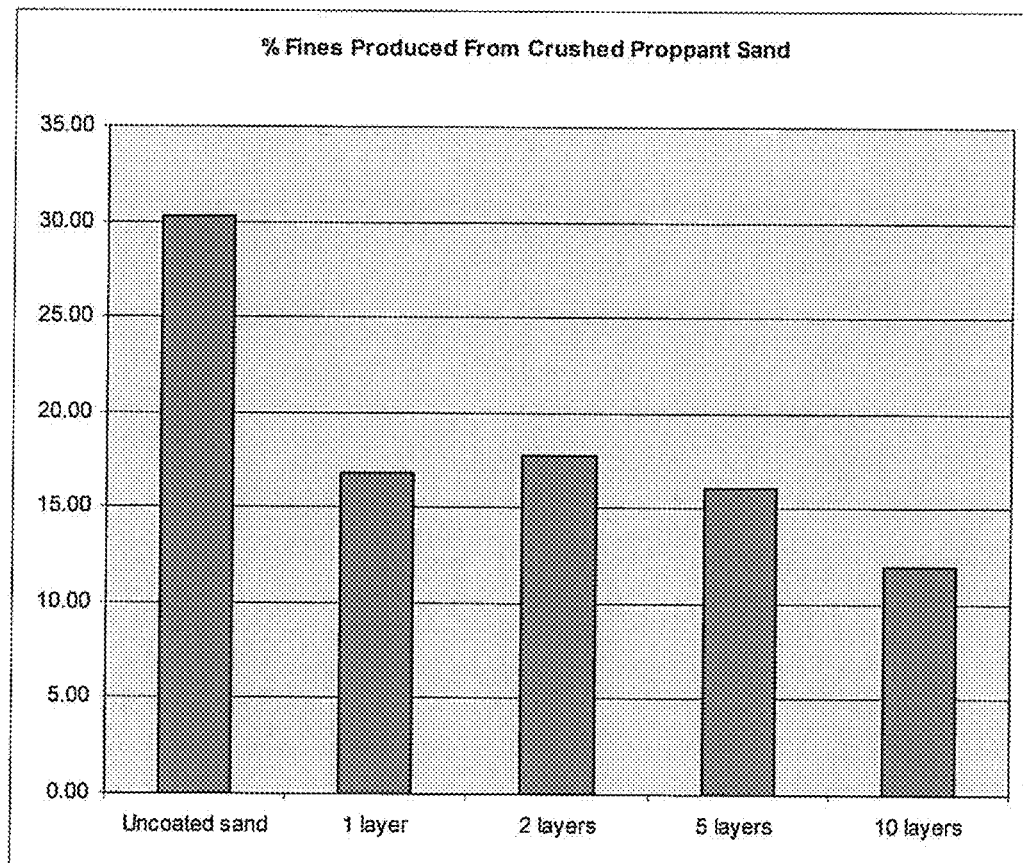

WELL TREATMENT OPERATIONS USING A TREATMENT AGENT COATED WITH ALTERNATING LAYERS OF POLYIONIC MATERIAL

FIELD OF THE INVENTION

The present invention relates to well treatment composites having a particulate substrate onto which is coated polyionic materials and methods of using such well treatment composites in treatment operations including hydraulic fracturing and gravel packing.

BACKGROUND OF THE INVENTION

Hydraulic fracturing is a common stimulation technique used to enhance production of hydrocarbon fluids and gas from subterranean formations. In a typical hydraulic fracturing treatment, a fracturing fluid containing solid proppants is injected into the wellbore at pressures sufficient to create or enlarge a fracture in the reservoir. The proppant is deposited in the fracture and serves to hold the fracture open, thereby enhancing the ability of hydrocarbons to migrate from the formation to the wellbore through the fracture. Because well productivity depends on the ability of a fracture to conduct hydrocarbons from the formation to the wellbore, fracture conductivity is an important parameter in determining the degree of success of a hydraulic fracturing treatment.

The creation of reservoir "fines" during hydraulic fracturing may be instrumental in reducing fracture conductivity. When proppant materials are subjected to reservoir closure stresses and are compressed together, fines are generated. Production of fines in the reservoir also often results in a reduction in reservoir permeability due to plugging of pore throats by the fines in the reservoir matrix.

Since the degree of stimulation afforded by the fracture treatment is dependent upon the propped width, it is important that the proppant exhibit resistance to crushing from the high stresses in the well. Improvements have been continuously sought to control and prevent the crushing of proppants at in-situ reservoir conditions. For instance, resin-coated proppant materials have been designed to help form a consolidated and permeable fracture pack when placed in the formation wherein the resin coating enhances the crush resistance of the proppant. The coating may further act as a tackifying agent to control fines from migrating into the proppant pack. The coating may be applied to the proppant by mixing proppant particulates with a resinous system and hardening the resin in-situ. Alternatively, a pre-coated proppant may be pumped into the formation with the fracturing fluid. Further, the proppant may be pumped into the formation and then consolidated with a curing solution which is pumped after the proppant material is in place.

Fines may further migrate during gravel packing. Gravel packing is a sand-control method employed to prevent the production of formation sand. Gravel packing treatments are used to reduce the migration of unconsolidated formation particulates into the wellbore. Typically, gravel pack operations involve placing a gravel pack screen in the wellbore and packing the surrounding annulus between the screen and the wellbore with gravel designed to prevent the passage of formation sands through the pack. The gravel pack screen is generally a type of filter assembly used to support and retain the gravel placed during the gravel pack operation. Particulates known in the art as gravel are carried to a wellbore by a hydrocarbon or water carrier fluid. The carrier fluid leaks off into the subterranean zone and/or is returned to the surface while the particulates are left in the zone. The resultant gravel pack acts as a filter to separate formation sands from produced fluids while permitting the produced fluids to flow into the wellbore.

In some situations the processes of hydraulic fracturing and gravel packing are combined into a single treatment to provide stimulated production and an annular gravel pack to reduce formation sand production. Such treatments are often referred to as "frac pack" operations. In some cases, the treatments are completed with a gravel pack screen assembly in place, and the hydraulic fracturing treatment being pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

To minimize the migration of formation fines, coated and/or uncoated particulates have further been used in gravel packing.

While the use of resin coated proppants has been successful in minimizing the generation of fines during hydraulic fracturing and fine migration during gravel packing, such materials are known to erode oil and gas production equipment. There is an ongoing need to develop particulates exhibiting crush resistance that can be used as proppants and gravel for minimizing fines generation and fines migration, reduce proppant pack and gravel pack damage, and which are less eroding to oil and gas production equipment.

SUMMARY OF THE INVENTION

The invention relates to a well treatment composite and well treatment fluids containing the well treatment composite. In addition, the invention relates to a method of making the well treatment composite and a method of using the well treatment composite in the treatment of a well.

The well treatment composite is composed of a particulate substrate. A polyelectrolyte bilayer is coated onto the particulate substrate. The polyelectrolyte bilayer contains a bottom layer and a top layer. The bottom layer of the polyelectrolyte bilayer is adjacent to the surface of the particulate substrate. Each of the bottom layer and the top layer of the polyelectrolyte bilayer contains oppositely charged polyionic materials.

In an aspect, the well treatment composite is composed of more than one polyelectrolyte bilayers coated onto the particulate substrate such that a second polyelectrolyte bilayer is coated onto the first polyelectrolyte bilayer (the polyelectrolyte bilayer adjacent to the particulate substrate). A third polyelectrolyte bilayer may be coated onto the second polyelectrolyte bilayer, a fourth polyelectrolyte bilayer may be coated onto the third polyelectrolyte bilayer and so on. Each polyelectrolyte bilayer contains a bottom layer and a top layer which contain polyionic material. The polyionic material of the bottom layer and the polyionic material in the top layer are oppositely charged (counterions). The bottom layer of each polyelectrolyte layer contains polyionic material which has a charge which is opposite to the charge of the polyionic materials in the top layer of the polyelectrolyte bilayer which is adjacent to it. For example, where the particulate substrate is coated with three polyelectrolyte bilayers then the polyionic material of the bottom layer of third polyelectrolyte bilayer has a charge which is opposite to the charge of the polyionic material of the top layer of the second polyelectrolyte bilayer and the polyionic material of the bottom layer of the fourth polyelectrolyte bilayer has a charge which is opposite to the charge of the polyionic material of the top layer of the third polyelectrolyte bilayer.

In another aspect, the particulate substrate contains a charge (for instance, where the particulate surface has been surface modified). In this instant, the polyionic material of the bottom layer of the polyelectrolyte bilayer coated onto the particulate substrate (the first polyelectrolyte bilayer) has a charge which is the opposite to the charge on the surface of the particulate substrate. The polyionic material of the top layer of the first polyelectrolyte bilayer is a counterion to the polyionic material of the bottom layer of the polyelectrolyte bilayer.

In another aspect, where the polyionic material of the bottom layer of the first polyelectrolyte bilayer is positively charged and the polyionic material of the top layer of the first polyelectrolyte bilayer is negatively charged, a second top layer may be added to the polyelectrolyte bilayer such that the most distant layer from the particulate substrate is positively charged. In an exemplary aspect, where the particulate substrate contains a negative charge, the first polyelectrolyte bilayer may be composed of three layers, each containing a polyionic material wherein such layers consist of the bottom layer (adjacent to the particulate substrate), a first top layer and a second top layer.

In another aspect, the particulate substrate may be composed of quartz, sand, glass beads, plastics, aluminum pellets, ceramics (including porous ceramics) and polymeric materials.

Including nanoparticles into one or more of the polyionic materials may improve the performance of the well treatment composite. For example, the crush strength of a proppant may increase with the addition of nanoparticles. Thus, nanoparticles may be included into the polyionic solutions so they are deposited with the polyionic materials.

In an aspect, the nanoparticles may have a surface charge. This permits the nanoparticles to be deposited with and to be bound to the polyionic materials. Thus, the surface charge of the nanoparticles may be the same charge as the polyionic material in the polyionic coating being applied. In an aspect, the nanoparticle may be clay (such as bentonite clay), alumina, or charged silica.

The well treatment composite may be a proppant or a sand control particulate and thus used in hydraulic fracturing or a sand control operation of a subterranean formation penetrated by a wellbore. The well treatment composite may reduce the production of fines from proppant and gravel packs. The composite may also reduce wear in pumping components and downhole tools, completion tubing and casing, and related hardware during operations.

In another aspect, the well treatment composite is prepared by first contacting the particulate substrate with a first coating solution which contains the polyionic material of the first polyelectrolyte bilayer. The polyionic material of the first coating solution is non-covalently bonded to the particulate substrate. In a preferred embodiment, prior to contacting the first coating solution the particulate substrate is not subjected to surface modification. The coated particulate substrate is subsequently removed after a layer of the polyionic material has formed on its surface. The particulate substrate may then be exposed to another solution of polyionic material, having the opposite charge of the polyionic material of the first solution, thereby depositing a second layer of polyionic material onto the surface of the particulate substrate. The polyelectrolyte bilayer is thus formed on the particulate substrate. Successive layers of polyionic material may be coated onto the polyelectrolyte bilayer via layer-by-layer deposition of the polyionic materials. Any suitable deposition techniques can be used in the layer-by-layer coating. Exemplary deposition techniques include, without limitation, dipping a substrate into a coating solution and spraying a substrate with a coating solution. There are many types of industrial coating processes, all of which may be used to deposit the polyionic material. In an aspect, dip coating, spin coating, or spray coating may be used.

The layers of polyionic material bind to the surface of the particulate substrate and to one another substantially through electrostatic forces. The process may be repeated many times depositing polyionic materials layer-by-layer until an effective coating on the particulate substrate has formed.

BRIEF DESCRIPTION OF THE DRAWINGS

In order to more fully understand the drawings referred to in the detailed description of the present invention, a brief description of each drawing is presented, in which:

FIG. 1 illustrates the reduction in fines of uncoated sand particulates and composites of coated sand particulates defined by the invention after crushing for two minutes at 5550 pounds per square inch (psi).

DETAILED DESCRIPTION OF THE PREFERRED EMBODIMENTS

Illustrative embodiments of the invention are described below as they might be employed in the operation and in the treatment of oilfield applications. In the interest of clarity, not all features of an actual implementation are described in this specification. It will of course be appreciated that in the development of any such actual embodiment, numerous implementation-specific decisions must be made to achieve the developers' specific goals, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the invention will become apparent from consideration of the following description.

The well treatment composites defined are prepared by at least partially coating a particulate substrate.

Generally, the particulate substrate may be deformable or non-deformable and may be non-porous or porous and may be inorganic or organic in nature. In a preferred embodiment, the particulate substrate is non-deformable and is composed of quartz, sand, glass beads, plastics, aluminum pellets, ceramics (including porous ceramics) or a polymeric material.

The particulate substrate may also be a deformable particulate (particulates that yield upon application of a minimum threshold level to point to point stress) include naturally occurring materials, such as (a) chipped, ground or crushed shells of nuts such as walnut, pecan, coconut, almond, ivory nut, brazil nut, etc.; (b) chipped, ground or crushed seed shells (including fruit pits) of seeds of fruits such as plum, olive, peach, cherry, apricot, etc.; (c) chipped, ground or crushed seed shells of other plants such as maize (e.g., corn cobs or corn kernels), etc.; and (d) processed wood materials such as those derived from woods such as oak, hickory, walnut, poplar, mahogany, etc. Deformable particulates may further include such copolymers as polystyrene divinylbenzene terpolymers (including polystyrene/divinyl benzene) and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

Suitable particulate substrates include those relatively lightweight particulates having an apparent specific gravity (ASG) (API RP 60) less than 2.65. For instance, the relatively lightweight particulates are ultra lightweight (ULW) having an ASG less than or equal to 2.45. Even more preferred are those ULW particulates having an ASG less than or equal to 2.25, preferably less than or equal to 2.0, more preferably less than or equal to 1.75, even more preferably less than or equal to 1.5, most preferably less than or equal to 1.25.

The particulate substrate is coated with a polyelectrolyte bilayer which is composed of two layers. Each layer of the polyelectrolyte bilayer is composed of polyionic material. The polyionic material in one of the layers has an opposites charge to the polyionic material in the other layer. For purposes herein, the innermost layer to the particulate substrate, i.e., the layer immediately adjacent to the particulate substrate, shall be termed "the bottom layer". Adjacent to the bottom layer (on the opposite side of the particulate substrate) is the top layer. The top layer is composed of polyionic material which are counterions to the polyionic material in the bottom layer. The bottom layer and the top layer constitute the polyelectrolyte bilayer.

The well treatment composite may further contain one or more additional polyelectrolyte bilayers coated onto the particulate substrate. Each successive polyelectrolyte bilayer would be coated onto the first polyelectrolyte layer which is adjacent to the particulate substrate.

Each additional polyelectrolyte bilayer consists of a bottom layer composed of a polyionic material and a top layer composed of a second polyionic material wherein the polyionic material in the bottom layers and top layers are oppositely charged.

Each polyelectrolyte bilayer is laid onto the particulate substrate in succession such as in a self-assembly. The polyionic material in the bottom layer of each successive polyelectrolyte bilayer has a charge which is opposite to the charge of the polyionic material in the top layer to which the successive polyelectrolyte bilayer is adjacent. For example, where three polyelectrolyte bilayers are coated onto the particulate substrate, the polyionic material in the bottom layer of the third polyelectrolyte bilayer is opposite to the charge of the polyionic material in the top layer of the second polyelectrolyte bilayer. In those instances where four polyelectrolyte bilayers are coated onto the particulate substrate, the charge of the polyionic material in the bottom polyionic layer of the fourth polyelectrolyte bilayer is opposite to the charge of the polyionic material of the top layer of the third polyelectrolyte bilayer and so on.

The number of polyionic layers on the particulate substrate may be as high as 1,000 though usually is less than 40 and typically is between 2 and 20.

It may be preferred to modify the surface of the particulate substrate in order to enhance electrostatic bonding between the particulate substrate and the bottom polyionic layer of the polyelectrolyte bilayer adjacent to the particulate substrate. Surface modification may thus charge the surface of the particulate substrate such that the polyionic materials of the bottom layer of the first polyelectrolyte bilayer deposited onto the particulate substrate may more easily bind to the substrate. For instance, when the particulate substrate is sand, the surface of the sand may be silylated in order to attract the charge of polyionic material of the bottom layer of the first polyelectrolyte bilayer, i.e., the polyionic material adjacent to the particulate substrate. When the particulate substrate is ceramic, the surface of the ceramic may be hydroxylated in order to counter the charge of the polyionic material of the polyelectrolyte bilayer adjacent to the charged ceramic.

When the particulate substrate contains charged materials, it is necessary that the polyionic material of the bottom layer of the first polyelectrolyte bilayer coated onto the particulate substrate have a charge which is the opposite to the charge of the particulate substrate. The polyionic material of the top layer of the first polyelectrolyte bilayer is a counterion to the polyionic material of the bottom layer.

In some instances, the polyionic material of the bottom layer of the first polyelectrolyte bilayer may be positively charged. This would be the case, for example, where the particulate substrate carries a negative charge. The polyionic material of the top layer of the first polyelectrolyte bilayer would thus carry a negative charge. In such instances, it may be desirable to apply a second top layer, i.e., a second coating on top of the first top coating, such that the polyionic material of the second top coating is oppositely charged to the polyionic material of the first top coating. The second top layer is often desirable in order to seal or embed the negatively charged polyionic material of the first top coating within the matrix defined by the first top layer and the bottom layer of the first polyelectrolyte layer. Thus, for instance, where the particulate substrate is negatively charged, the bottom layer may be composed of positively charged polyionic material, the first top layer may be composed of negatively charged polyionic material and the second top layer would then be composed of positively charged polyionic material. The polyionic material of the bottom layer of a second polyelectrolyte bilayer, when present, would be of a negative charge.

The polyionic material used in the well treatment composite refers to a charged polymer that has a plurality of charged groups in a solution, or a mixture of charged polymers each of which has a plurality of charged groups in a solution. Exemplary charged polymers include polyelectrolytes. Polyionic materials include both polycationic (having positive charges) and polyanionic (having negative charges) polymeric materials.

The polyionic materials that may be employed in the present invention include polyanionic and polycationic polymers. Examples of suitable polyanionic polymers include, for example, a synthetic polymer, a biopolymer or modified biopolymer comprising carboxy, sulfo, sulfato, phosphono or phosphate groups or a mixture thereof, or a salt thereof.

Examples of synthetic polyanionic polymers are: a linear polyacrylic acid (PAA), a branched polyacrylic acid, a polymethacrylic acid (PMA), a polyacrylic acid or polymethacrylic acid copolymer, a maleic or fumaric acid copolymer, a poly(styrenesulfonic acid) (PSS), a polyamido acid, a carboxy-terminated polymer of a diamine and a di- or polycarboxylic acid, a poly(2-acrylamido-2-methylpropanesulfonic acid) (poly-(AMPS)), an alkylene polyphosphate, an alkylene polyphosphonate, a carbohydrate polyphosphate or carbohydrate polyphosphonate (e.g., a teichoic acid). Examples of a copolymer of acrylic or methacrylic acid include a copolymerization product of an acrylic or methacrylic acid with a vinyl monomer including, for example, acrylamide, N,N-dimethyl acrylamide or N-vinylpyrrolidone. Examples of polyanionic biopolymers or modified biopolymers are: hyaluronic acid, glycosaminoglycanes such as heparin or chondroitin sulfate, fucoidan, poly-aspartic acid, poly-glutamic acid, carboxymethyl cellulose, carboxymethyl dextrans, alginates, pectins, gellan, carboxyalkyl chitins, carboxymethyl chitosans, sulfated polysaccharides.

A preferred polyanionic polymer is a linear or branched polyacrylic acid or an acrylic acid copolymer. Another preferred anionic polymer is a linear or branched polyacrylic acid. A branched polyacrylic acid in this context is to be understood as meaning a polyacrylic acid obtainable by polymerizing acrylic acid in the presence of suitable amounts of a di- or polyvinyl compound.

The most preferred polyanionic polymer is poly(sodium styrene sulfonate).

A suitable polycationic polymer is, for example, a synthetic polymer, biopolymer or modified biopolymer comprising primary, secondary, or tertiary amines or quaternary ammonium groups or a suitable salt thereof, for example a hydrohalide such as a hydrochloride thereof, in the backbone or as substituents. Polycationic polymers comprising primary or secondary amino groups or a salt thereof are preferred.

Examples of synthetic polycationic polymers are:

(i) a polyallylamine hydrochloride (PAH) homo- or copolymer, optionally comprising modifier units;

(ii) a polyethyleneimine (PEI);

(iii) a polyvinylamine homo- or copolymer, optionally comprising modifier units;

(iv) a poly[vinylbenzyl-tri(C1-C4 alkyl)ammonium salt], for example poly(vinylbenzyl-trimethylammonium chloride);

(v) a polymer resulting from a step-wise polymerization (quaternization) reaction between a dihalide and N,N,N',N'-tetra(C1-C4 alkyl)-alkylenediamine, for example a polymer from (a) propylene-1,3-dichloride or -dibromide or o-, m-, or p-xylene dichloride or dibromide and (b) N,N,N',N'-tetramethyl-1,4-tetramethylenediamine;

(vi) a poly(vinylpyridine) or poly(vinylpyridinium salt) homo- or copolymer;

(vii) a polymer via ring-forming polymerization of N,N-diallyl-N,N-di(C1-C4 alkyl)ammonium halide, comprising units of the formula:

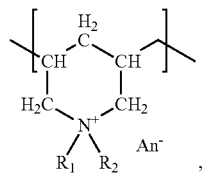

wherein $R_1$ and $R_2$ are each independently $C_1$-$C_4$ alkyl, in particular methyl, and $An^-$ is an anion, for example, a halide anion such as the chloride anion;

(viii) a homo- or copolymer of a quaternized di(C1-C4 alkyl)aminoethyl acrylate or methacrylate, for example a poly[2-hydroxy-3-methacryloylpropyltri(C1-C2 alkyl)ammonium salt] homopolymer, such as poly(2-hydroxy-3-methacryloylpropyltrimethylammonium chloride), or a quaternized poly(2-dimethylaminoethyl methacrylate or a quaternized poly(vinylpyrrolidone-co-2-dimethylaminoethyl methacrylate); or (ix) a polyaminoamide (PAMAM), for example a linear PAMAM or a PAMAM dendrimer.

The above mentioned polymers comprise in each case the free amine, a suitable salt thereof, as well as any quaternized form, if not specified otherwise.

The most preferred polycationic polymer is poly(diallyldimethylamine hydrochloride).

Suitable comonomers optionally incorporated in the polymers according to (i), (iii), (vi) or (viii) above are, for example, hydrophilic monomers such as acrylamide, methacrylamide, N,N-dimethyl acrylamide, N-vinylpyrrolidone and the like.

Suitable modifier units of the polyallylamine (i) are known and comprise, for example, units of formula:

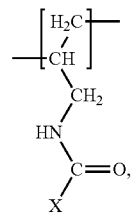

wherein X is C1-C6 alkyl, which is substituted by two or more of the same or different substituents selected from the group consisting of hydroxy, C1-C5 alkanoyloxy, and C1-C5 alkylaminocarbonyloxy.

Preferred substituents of the alkyl radical X are hydroxy, acetyloxy, propionyloxy, methyl-aminocarbonyloxy or ethyl-aminocarbonyloxy, especially hydroxy, acetyloxy or propionyloxy and in particular hydroxy. X is preferably linear C3-C6 alkyl, more preferably linear C4-C5 alkyl, and most preferably n-pentyl, which is in each case substituted as defined above. A particularly preferred radical X is 1,2,3,4,5-pentahydroxy-n-pentyl.

It is often preferred to include nanoparticles in the polyionic solutions in order improve the performance of the deposited coating. Since the nanoparticles are deposited along with the polyionic material onto the particulate substrate, it is desirable that they have a surface charge allowing them to be deposited with and to bind to the polyionic materials. Any type of nanoparticle that has a surface charge capable of binding with the depositing polyelectrolytes may be used in accord with the principles of the invention. In an aspect, the nanoparticle may be a clay (such as bentonite clay), alumina, or charged silica. When present, the amount of nanoparticles included in the polyionic solution is between from about 0.01% to about 0.5%, preferably from about 0.05% to about 0.1%.

The well treatment composite is preferably prepared by a "layer-by-layer" methodology wherein each layer of a material is non-covalently bond to another layer of a different material.

For instance, the well treatment composite may be prepared by first contacting the particulate substrate with a first coating solution which contains the polyionic material of the bottom layer in order to non-covalently apply the innermost layer of the polyionic material onto the substrate. Typically, the amount of polyionic material in a coating solution as defined herein is between from about 0.02 to about 2 percent by volume, typically between from about 0.05 to about 0.1 percent by volume.

The particulate substrate having the innermost layer of the polyionic material attached to its surface is then contacted with a second coating solution containing the polyionic material comprising the top layer. The combination of the two layers of polyionic material forms a first polyelectrolyte bilayer on top of the particulate substrate; the first polyelectrolyte bilayer consisting of the bottom or innermost layer to the particulate substrate composed of a first polyionic material and a top layer of a polyionic material on top of the innermost layer; the second polyionic material having charges opposite of the charges of the first polyionic material. Additional layers may then be added to the substrate by further incorporating steps of contacting the substrate having the first polyelectrolyte bilayer with a third coating solution.

The third coating solution contains a third polyionic material having a charge which is opposite to the charge of the second polyionic material. The third polyionic material may be the same as the first polyionic material or may be another polyionic material with the same charge as the first polyionic material. The third polyionic layer is thus formed on top of the first polyelectrolyte bilayer. A fourth polyionic coating may then be applied onto the third polyionic layer on the substrate in order to form a second polyelectrolyte bilayer composed of the third polyionic material and the fourth polyionic material. The fourth polyionic material has a charge opposite to the charge of the third polyionic material. The fourth polyionic material may be composed of the same material as the second polyionic material or may be another polyionic material with the same charge as the second polyionic material. The method may then be repeated in a like manner to form one or more additional polyelectrolyte bilayers.

One or more rinsing steps may be included during the process of making the composite, especially between steps of applying successive polyionic coating layers containing polyionic materials of unlike charges. The rinsing steps are carried out by contacting the particulate substrate with a rinsing solution. The rinsing solution may be an aqueous solution.

To effectively deposit the first layer of polyionic material, the surface of the particulate substrate may need to be charged making it capable of having electrostatic interactions with the polyionic material. For a proppant such as sand this step may be unnecessary. Sand is largely composed of silica ($SiO_2$), which has Si—O$^-$ groups or Si—OH groups that readily hydrolyze, found along its surface. These Si—O$^-$ groups allow for the first layer polyelectrolyte to bind. Other types of proppant may be neutrally charged at their surface and, hence, not capable forming a substantial electrostatic interaction to bind with the first polyelectrolyte layer. These proppants would have to undergo an initial step to place a charge on their surface. Any method that places a charge on the proppant surface allowing it to interact with the first polyelectrolyte layer is in accord with the principles of the present invention. For example, a proppant may need to undergo a silylation reaction placing Si—OH groups along its surface.

In preferred embodiments, the particulate coating that eliminates sharp edges on the particulate and functions as a lubricant to materially reduce mechanical erosion of the pumping components. Ideally, the coated particulate will have a low friction factor and high impact resistance that renders it resistant to chipping and shattering.

The layers of polyionic material bind to the surface of the particulate substrate and to one another substantially through electrostatic forces.

The well treatment composites defined herein are particularly effective in hydraulic fracturing as well as sand control fluids such as water, salt brine, slickwater such as slick water fracture treatments, low concentration polymer gel fluids (linear or crosslinked), foams (with gas) fluid, liquid gas such as liquid carbon dioxide fracture treatments for deeper proppant penetration, treatments for water sensitive zones, and treatments for gas storage wells.

The well treatment composites may be mixed and pumped during any desired portion's of a well treatment such as hydraulic fracturing treatment or sand control treatment and may be mixed in any desired concentration with a carrier fluid. Suitable carrier fluids may be used in combination with gelling agents, crosslinking agents, gel breakers, surfactants, foaming agents, demulsifiers, buffers, clay stabilizers, acids, or mixtures thereof.

The use of the well treatment composites as a proppant advantageously provides for substantially improved overall system performance in stimulation procedure, such as hydraulic fracturing applications, as well as other well treating applications such as sand control. When used in hydraulic fracturing, the well treatment composites may be injected into a subterranean formation in conjunction with a hydraulic fracturing treatment or other treatment at pressures sufficiently high enough to cause the formation or enlargement of fractures.

Other well treating applications may be near wellbore in nature (affecting near wellbore regions) and may be directed toward improving wellbore productivity and/or controlling the production of fracture proppant or formation sand. Particular examples include gravel packing and "frac-packs." Moreover, such particles may be employed alone as a fracture proppant/sand control particulate, or in mixtures in amounts and with types of fracture proppant/sand control materials, such as conventional fracture or sand control particulate.

In one exemplary embodiment, a gravel pack operation may be carried out on a wellbore that penetrates a subterranean formation to prevent or substantially reduce the production of formation particles into the wellbore from the formation during production of formation fluids. The subterranean formation may be completed so as to be in communication with the interior of the wellbore by any suitable method known in the art, for example by perforations in a cased wellbore, and/or by an open hole section. A screen assembly such as is known in the art may be placed or otherwise disposed within the wellbore so that at least a portion of the screen assembly is disposed adjacent the subterranean formation. A slurry including the well treatment composites and a carrier fluid may then be introduced into the wellbore and placed adjacent the subterranean formation by circulation or other suitable method so as to form a fluid-permeable pack in an annular area between the exterior of the screen and the interior of the wellbore that is capable of reducing or substantially preventing the passage of formation particles from the subterranean formation into the wellbore during production of fluids from the formation, while at the same time allowing passage of formation fluids from the subterranean formation through the screen into the wellbore.

As an alternative to use of a screen, the sand control method may use the well treatment composites in accordance with any method in which a pack of particulate material is formed within a wellbore that it is permeable to fluids produced from a wellbore, such as oil, gas, or water, but that substantially prevents or reduces production of formation materials, such as formation sand, from the formation into the wellbore. Such methods may or may not employ a gravel pack screen, may be introduced into a wellbore at pressures below, at or above the fracturing pressure of the formation, such as frac pack, and/or may be employed in conjunction with resins such as sand consolidation resins is so desired.

In addition to hydraulic fracturing and sand control, the well treatment composites defined herein may be used in the corrosion protection of equipment, erosion/abrasion resistance of surfaces, chemical reaction delay mechanisms and other areas where a protective coating is beneficial. The composite may also reduce wear in pumping components, such as pump heads, and downhole tools, completion tubing and casing, and related hardware during operations.

EXAMPLES

The following examples describe the preferred embodiments of the present invention. Other embodiments within the scope of the claims will be apparent to those skilled in the art from the consideration of the specification or practice of the invention disclosed herein. It is intended that the specification, together with the examples, be considered exemplary only, with the scope and spirit of the invention being indicated by the claims.

Example 1

To form the coating, the sand was placed in an aqueous solution of 0.5% poly(allylamine hydrochloride) and 0.1% sodium chloride. The solution was decanted and the sand was rinsed. The sand was then placed in an aqueous solution of 0.08% poly(sodium styrene sulfonate). The solution was then decanted and the coated sand was rinsed.

Example 2

To form the coating, the sand was placed in an aqueous solution of 0.5% poly(allylamine hydrochloride) and 0.1% sodium chloride. The solution was decanted and the sand was rinsed. The sand was then placed in an aqueous solution of 0.08% poly(sodium-4-styrene sulfonate) and 0.2% bentonite nanoclay. The solution was then decanted and the treated sand was then placed into an aqueous solution of 0.5% poly(allylamine hydrochloride) and 0.1% sodium chloride. The solution was then decanted and the coated sand was rinsed to form a polyelectrolyte bilayer (first polyelectrolyte bilayer) on the sand particulate. A second polyelectrolyte bilayer was further coated onto particulates coated with the first polyelectrolyte bilayer by placing such coated particulates in an aqueous solution of 0.08% poly(sodium-4-styrene sulfonate) and 0.2% bentonite nanoclay. The solution was then decanted and the treated sand was then placed into an aqueous solution of 0.5% poly(allylamine hydrochloride) and 0.1% sodium chloride. This process was repeated in succession to obtain a substrate particulate containing 5 and 10 polyelectrolyte bilayers. The composites were then subjected to crush for 2 minutes at 5,550 psi. The results are graphically displayed in FIG. 1. FIG. 1 illustrates that crush resistance of the particulate substrate was dramatically improved by coating of the particulate substrate with one or more polyelectrolyte bilayers. FIG. 1 shows that one polyelectrolyte bilayer reduces fines production by almost one half and that ten layers of polyelectrolyte bilayers reduce fines to almost one third as compared to uncoated sand.

While the compositions and methods in accordance with the present invention have been described in terms of preferred embodiments, it will be apparent to those of skill in the art that variations can be applied to the compositions and/or methods and in the steps or in the sequence of steps described herein without departing from the concept, spirit and scope of the invention. Moreover, it will be apparent that certain agents that are chemically related can be substituted for the agents described herein while the same or similar results would be achieved. All such similar substitutes and modifications apparent to those skilled in the art are deemed to be within the scope and concept of the invention. It is intended that the specification be considered exemplary only, with the scope and spirit of the invention being indicated by the claims which follow.

The invention claimed is:

1. A method of treating a subterranean formation penetrated by a wellbore which comprises introducing into the wellbore a well treatment composite comprising a proppant or a sand control particulate substrate, wherein the proppant or the sand control particulate substrate is coated with a first polyelectrolyte bilayer, wherein the first polyelectrolyte bilayer comprises a bottom layer comprising a polyionic material and a first top layer comprising a polyionic material, wherein:
    (a) the bottom layer is bond to the proppant or the sand control particulate substrate through an electrostatic force; and
    (b) the polyionic material of the bottom layer and the polyionic material of the first top layer are oppositely charged and are bond to each other through an electrostatic force.

2. The method of claim 1, wherein the well treatment composite further comprises a second polyelectrolyte bilayer coated onto the first polyelectrolyte bilayer wherein the second polyelectrolyte bilayer comprises a bottom layer comprising a polyionic material and a top layer comprising a polyionic material and wherein the bottom layer of the second polyelectrolyte bilayer is bond to the top layer of the first polyelectrolyte bilayer through an electrostatic force.

3. The method of claim 2, wherein the polyionic material of the bottom layer of the first polyelectrolyte bilayer and the polyionic material of the top layer of the second polyelectrolyte bilayer are the same material.

4. The method of claim 2, wherein a succession of polyelectrolyte bilayers are coated onto the particulate substrate wherein each successive polyelectrolyte bilayer comprises a bottom layer comprising a polyionic material and a top layer comprising a polyionic material, wherein the polyionic material of the bottom layer of each successive polyelectrolyte is the counterion to the top layer of the adjacent polyelectrolyte bilayer and further wherein the bottom layer of each successive polyelectrolyte is bond to the top layer of the adjacent polyelectrolyte bilayer through an electrostatic force.

5. The method of claim 1, wherein the proppant or sand control particulate substrate is sand.

6. The method of claim 1, wherein the polyionic material of one layer of the first polyelectrolyte bilayer is poly(allylamine hydrochloride) and the polyionic material of another layer of the first polyelectrolyte bilayer is poly(sodium styrene sulfonate).

7. The method of claim 1, wherein the well treatment composite is a proppant.

8. The method of claim 1, wherein at least one of the polyionic materials is composed of nanoparticles.

9. The method of claim 8, wherein the nanoparticles are bentonite clay.

10. The method of claim 1, wherein the particulate substrate is ceramic.

11. The method of claim 1, wherein the proppant or sand control particulate substrate is charged and wherein the polyionic material of the bottom layer of the first polyelectrolyte bilayer and the particulate substrate are oppositely charged.

12. The method of claim 11, wherein the proppant or sand control particulate substrate has a positive charge.

13. The method of claim 12, wherein the well treatment composite further comprises a second polyelectrolyte bilayer coated onto the first polyelectrolyte bilayer wherein the second polyelectrolyte bilayer comprises a bottom layer comprising a polyionic material and a top layer comprising a polyionic material and further wherein (i) the polyionic material of the bottom layer of the second polyelectrolyte bilayer is adjacent to and is a counterion to the top layer of the first polyelectrolyte bilayer; and (ii) the bottom layer of the second polyelectrolyte bilayer is bond to the top layer of the first polyelectrolyte bilayer through an electrostatic force.

14. The method of claim 13, wherein a succession of one or more polyelectrolyte bilayers are coated onto the second polyelectrolyte bilayer wherein each successive polyelectrolyte bilayer comprises a bottom layer comprising a polyionic material and a top layer comprising a polyionic material, wherein (i) the polyionic material of the bottom layer of each successive polyelectrolyte is the counterion to the polyionic material of the top layer of the adjacent polyelectrolyte bilayer; and (ii) the bottom layer of each successive polyelectrolyte is bond to the top layer of the adjacent polyelectrolyte layer through an electrostatic force.

15. The method of claim 11, wherein the proppant or sand control particulate substrate has a negative charge.

16. The method of claim 1, wherein the first polyelectrolyte bilayer of the well treatment composite further comprises a second top layer comprising a polyionic material wherein the first top layer is between the bottom layer and the second top layer and wherein the polyionic material of the first top layer and the polyionic material of the second top layer of the first polyelectrolyte bilayer are oppositely charged counterions.

17. The method of claim 16, wherein the polyionic material of the bottom layer and the second top layer are the same material.

18. The method of claim 16, wherein the well treatment composite further comprises a second polyelectrolyte bilayer coated onto the first polyelectrolyte bilayer wherein the second polyelectrolyte bilayer comprises a bottom layer comprising a polyionic material and a top layer comprising a polyionic material and further wherein (i) the polyionic material of the bottom layer of the second polyelectrolyte bilayer is adjacent to and is a counterion to the second top layer of the first polyelectrolyte bilayer; and (ii) the bottom layer of the second polyelectrolyte bilayer is bond to the second top layer of the first polyelectrolyte bilayer through an electrostatic force.

19. The method of claim 18, wherein a succession of one or more polyelectrolyte bilayers are coated onto the second polyelectrolyte bilayer wherein each successive polyelectrolyte bilayer comprises a bottom layer comprising a polyionic material and a top layer comprising a polyionic material, wherein (i) the polyionic material of the bottom layer of each successive polyelectrolyte is the counterion to the polyionic material of the top layer of the adjacent polyelectrolyte bilayer; and (ii) the bottom layer of each successive polyelectrolyte is bond to the top layer of the adjacent polyelectrolyte bilayer through an electrostatic force.

20. The method of claim 11, wherein the proppant or sand control particulate substrate is either silylated or hydroxylated.

21. The method of claim 16, wherein the polyionic material of the bottom layer of the first polyelectrolyte bilayer is poly(allylamine hydrochloride) and the polyionic material of the first top layer is poly(sodium styrene sulfonate).

22. The method of claim 21, wherein the polyionic material of the bottom layer is poly(diallyldimethylammonium chloride).

23. The method of claim 11, wherein at least one of the polyionic materials is composed of nanoparticles.

24. The method of claim 23, wherein the nanoparticles are bentonite clay.

25. A sand control method for a wellbore penetrating a subterranean formation, comprising:
introducing into the wellbore a slurry comprising particulates and a carrier fluid, wherein the particulates are well treatment composites comprising a particulate substrate onto which is coated a first polyelectrolyte bilayer, wherein the first polyelectrolyte bilayer comprises a bottom layer comprising a polyionic material and a first top layer comprising a polyionic material, wherein:
(a) the bottom layer is adjacent to the particulate substrate; and
(b) the polyionic material of the bottom layer and the polyionic material of the first top layer are oppositely charged and wherein the bottom layer of the first polyelectrolyte bilayer is bond to the particulate substrate through an electrostatic force;
placing at least a portion of the well treatment composites adjacent the subterranean formation to form a fluid-permeable pack capable of reducing or substantially preventing the passage of formation particles from the subterranean formation into the wellbore while allowing passage of formation fluids from the subterranean formation into the wellbore.

26. The method of claim 25, wherein the well treatment composite further comprises a second polyelectrolyte bilayer coated onto the first polyelectrolyte bilayer wherein the second polyelectrolyte bilayer comprises a bottom layer comprising a polyionic material and a top layer comprising a polyionic material and wherein the bottom layer of the second polyelectrolyte bilayer is bond to the top layer of the first polyelectrolyte bilayer through an electrostatic force.

27. The method of claim 25, wherein a succession of polyelectrolyte bilayers are coated onto the particulate substrate wherein each successive polyelectrolyte bilayer comprises a bottom layer comprising a polyionic material and a top layer comprising a polyionic material, wherein (i) the polyionic material of the bottom layer of each successive polyelectrolyte is the counterion to the top layer of the adjacent polyelectrolyte bilayer and (ii) the bottom layer of each successive polyelectrolyte is bond to the top layer of the adjacent polyelectrolyte bilayer through an electrostatic force.

28. The method of claim 25, wherein the polyionic material of the bottom layer of the first polyelectrolyte bilayer and the polyionic material of the top layer of the second polyelectrolyte bilayer are the same material.

* * * * *